United States Patent
Kapinos et al.

(10) Patent No.: US 12,446,124 B2
(45) Date of Patent: Oct. 14, 2025

(54) DISPLAY DIAGNOSTIC SYSTEM AND METHOD

(71) Applicant: LENOVO (SINGAPORE) PTE. LTD., Singapore (SG)

(72) Inventors: Robert J. Kapinos, Durham, NC (US); Scott Li, Cary, NC (US); Igor Stolbikov, Apex, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 201 days.

(21) Appl. No.: 18/481,811

(22) Filed: Oct. 5, 2023

(65) Prior Publication Data

US 2025/0119993 A1    Apr. 10, 2025

(51) Int. Cl.
*H05B 45/18* (2020.01)
*G06F 11/263* (2006.01)
*H05B 45/12* (2020.01)
*H05B 45/14* (2020.01)
*H05B 45/355* (2020.01)
*H05B 45/50* (2022.01)
*H05B 47/19* (2020.01)

(52) U.S. Cl.
CPC ........... *H05B 45/18* (2020.01); *G06F 11/263* (2013.01); *H05B 45/12* (2020.01); *H05B 45/14* (2020.01); *H05B 45/355* (2020.01); *H05B 45/50* (2020.01); *H05B 47/19* (2020.01)

(58) Field of Classification Search
CPC ........ H05B 45/18; H05B 45/12; H05B 45/14; H05B 45/355; H05B 45/50; H05B 47/19; G06F 11/263
USPC ......................................................... 315/309
See application file for complete search history.

(56) References Cited

U.S. PATENT DOCUMENTS

2017/0303368 A1* 10/2017 Brebenel ................ H05B 45/37
2025/0119993 A1*  4/2025 Kapinos ............... H05B 45/355

\* cited by examiner

*Primary Examiner* — Ryan Jager
(74) *Attorney, Agent, or Firm* — Dean D. Small; The Small Patent Law Group, LLC (57) ABSTRACT

A display diagnostic system and method include a sensor configured to monitor a parameter of a light emitter of a display device. The light emitter is configured to emit light to illuminate a display screen of the display device. The light emitter is powered by an inverter of the display device. The system and method include one or more processors that receive a sensor signal generated by the sensor. The sensor signal is indicative of the parameter of the light emitter monitored by the sensor at a first time. The one or more processors are configured to determine that the light emitter is inactive at the first time based on the sensor signal, and, responsive to determining that the light emitter is expected to be active at the first time, generate a control signal indicating a fault state of the inverter.

20 Claims, 3 Drawing Sheets

DISPLAY DIAGNOSTIC SYSTEM AND METHOD

FIELD

The present disclosure generally relates to electronic display devices and diagnostics related to electronic display devices.

BACKGROUND OF THE INVENTION

Some display devices, such as computer monitors and televisions, are backlit. Backlit display devices may include a semi-transparent screen and a backlight that illuminates the semi-transparent screen to display content to an observer. The backlight may include an array of light emitters, such as light emitting diodes (LEDs). The array of light emitters may require relatively high electrical current, and some backlit display devices may feature an inverter that powers all of the light emitters in the array. The inverter may increase or step up the voltage and current of the electrical power that is received from a power source before supplying the stepped-up electrical power to the light emitter array.

Inverter failure is one type of fault of backlit display devices. For example, if the inverter fails, the light emitter array does not receive power. The screen is dark (e.g., not illuminated) because the light emitters do not emit light. It may be difficult to detect and diagnose an inverter failure. For example, it may be difficult for a control system to identify the inverter as the reason for the dark, unlit screen instead of other potential component failures, such as LED failures, damaged electrical wiring, and/or the like. Inverter failure may be difficult to diagnose because the high current output side of the inverter may be electrically isolated from circuitry that can report back to the control system. Because of the difficulty to diagnose the true source of the issue, users may replace the wrong components and/or may replace more components than necessary to remedy the issue. For example, a user may replace an entire display device, when replacing the inverter alone could have solved the unlit screen problem.

A need remains for a system and method for efficiently and accurately diagnosing inverter failures in backlit display devices.

SUMMARY

In accordance with an embodiment, a display diagnostic system includes a memory, a sensor, and one or more processors communicatively connected to the memory and the sensor. The memory is configured to store program instructions. The sensor is configured to monitor a parameter of a light emitter of a display device. The light emitter is configured to emit light to illuminate a display screen of the display device. The light emitter is powered by an inverter of the display device. The program instructions are executable by the one or more processors to receive a sensor signal generated by the sensor. The sensor signal is indicative of the parameter of the light emitter monitored by the sensor at a first time. The program instructions are executable by the one or more processors to determine that the light emitter is inactive at the first time based on the sensor signal, and, responsive to determining that the light emitter is expected to be active at the first time, generate a control signal indicating a fault state of the inverter.

In an example, the sensor is a temperature sensor configured to monitor thermal output of the light emitter as the parameter. In another example, the sensor is an optical sensor configured to monitor a light output of the light emitter as the parameter. In another example, the sensor is a current sensor configured to monitor electric current received by the light emitter from the inverter as the parameter. The sensor may be disposed within a case of a display device.

Optionally, the inverter includes transformer circuitry configured to receive electric current from a power source at a first current level and to output the electric current at a second current level to the light emitter. The second current level is greater than the first current level. Optionally, the display device includes a backlight, and the light emitter forms a portion of the backlight.

Optionally, the one or more processors are configured to implement a test pattern that instructs the light emitter to be active at the first time. The one or more processors may determine that the light emitter is expected to be active at the first time based on the test pattern that is implemented.

Optionally, the sensor signal is an analog sensor signal, and the display diagnostic system also includes an analog-to-digital converter. The analog-to-digital converter may convert the analog sensor signal to a digital sensor signal which is transmitted along a display port link to the one or more processors. The digital sensor signal may be transmitted to the one or more processors within an auxiliary channel of the display port link.

Optionally, the display device is a first display device of multiple display devices configured to display content directed by a graphics processing unit. The one or more processors may generate the control signal to electrically disconnect the first display device that includes the inverter that has the fault state. Optionally, the one or more processors are configured to generate the control signal to one or more of (i) notify an operator of the display device that the inverter has the fault state, (ii) log a record of the fault state of the inverter in a database, or (iii) initiate an additional diagnostic test on the inverter.

In accordance with an embodiment, a method for diagnosing a display device is provided. The method includes receiving, via one or more processors, a sensor signal generated by a sensor configured to monitor a parameter of a light emitter of a display device. The light emitter is configured to emit light to illuminate a display screen of the display device. The light emitter is powered by an inverter of the display device. The sensor signal is indicative of the parameter of the light emitter monitored by the sensor at a first time. The method includes determining that the light emitter is inactive at the first time based on the sensor signal. Responsive to determining that the light emitter is expected to be active at the first time, the method includes generating a control signal indicating a fault state of the inverter.

Optionally, the sensor is a temperature sensor, and receiving the sensor signal includes receiving the sensor signal that provides a thermal output value of the light emitter as the parameter.

Optionally, the method includes implementing a test pattern that instructs the inverter to power the light emitter to emit light at the first time. Determining that the light emitted is expected to be active at the first time is based on implementing the test pattern.

Optionally, the sensor signal is an analog sensor signal. The method includes converting the analog sensor signal to a digital sensor signal, and transmitting the digital sensor signal along a display port link to the one or more processors.

Optionally, the display device is a first display device of multiple display devices configured to display content directed by a graphics processing unit. Generating the control signal indicating the fault state of the inverter includes electrically disconnecting the first display device that includes the inverter that has the fault state. Optionally, generating the control signal indicating the fault state of the inverter includes one or more of (i) notifying an operator of the display device that the inverter has the fault state, (ii) logging a record of the fault state of the inverter in a database, or (iii) initiating an additional diagnostic test on the inverter.

In accordance with an embodiment, a computer program product is provided that includes a non-transitory computer readable storage medium. The non-transitory computer readable storage medium includes computer executable code configured to be executed by one or more processors to receive a sensor signal generated by a temperature sensor disposed within a case of a display device. The temperature sensor is configured to monitor thermal output of a light emitter of the display device. The light emitter is configured to emit light to illuminate a display screen of the display device. The light emitter is powered by an inverter of the display device. The sensor signal is indicative of the thermal output of the light emitter monitored by the sensor at a first time. The computer executable code is configured to be executed by one or more processors to determine that the light emitter is inactive at the first time based on the sensor signal. Responsive to determining that the light emitter is expected to be active at the first time, the computer executable code is configured to be executed by one or more processors to generate a control signal indicating a fault state of the inverter.

Optionally, the one or more processors are configured to implement a test pattern that instructs the light emitter to be active at the first time. The one or more processors may determine that the light emitter is expected to be active at the first time based on the test pattern that is implemented.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Examples of the present disclosure describe a display diagnostic system and method for diagnosing a display device. Embodiments described herein use one or more sensors to monitor a parameter of a light emitter of a display device. The parameter is monitored to determine if the light emitter is active, meaning that the light emitter is receiving power and emitting light during at least a portion of a time period that the parameter is being monitored. Various types of sensors may be used to monitor different parameters that can be analyzed to indicate whether or not the light emitter is active. The system and method may analyze the sensor signals to determine, based on the parameter, that the light emitter is active or inactive. For example, in response to determining that the light emitter is active at a first time, the system and method may characterize the inverter of the display device as functional, meaning that the inverter is operating as intended without a fault. The system and method can track when the light emitted is expected to be active. If the light emitter is determined to be inactive (e.g., not emitting light) at a second time in which the light emitter is expected to be active, then the system and method may characterize the inverter as having a failure, such that the inverter is in a fault state. The fault state means that the system and method identify the inverter as a potential source of the defective display. For example, the display diagnostic system and method may determine that the light emitter is not receiving power from the inverter, such that the inverter may be defective, based on monitored activity of the light emitter that is contrary to the expected activity of the light emitter. Specifically, the fault state is determined when the light emitter is unlit at a time that the control system attempts to power the light emitter to emit light. The display diagnostic system and method may provide an indirect indication that the inverter is not functioning properly (e.g., is at fault) based on unexpected inactivity of the light emitter that is powered by the inverter.

After identifying the inverter as having the fault state, the system and method may take one or more responsive and/or remedial actions. For example, the system and method may electrically disconnect the particular display device that includes the faulty inverter from a system of multiple connected display devices. In addition or alternatively, the system and method may notify an operator of the display device that the inverter has the fault state, log a record of the fault state of the inverter in a database, and/or initiate an additional diagnostic test on the inverter.

The display diagnostic system and method may provide a mechanism for diagnosing the inverter as a potential source of a fault without having to disconnect and disassemble the display device. By identifying the inverter as the potential fault source, the inverter may be replaced without replacing the entire display device, extending the operating life of the display device.

Figure 1:
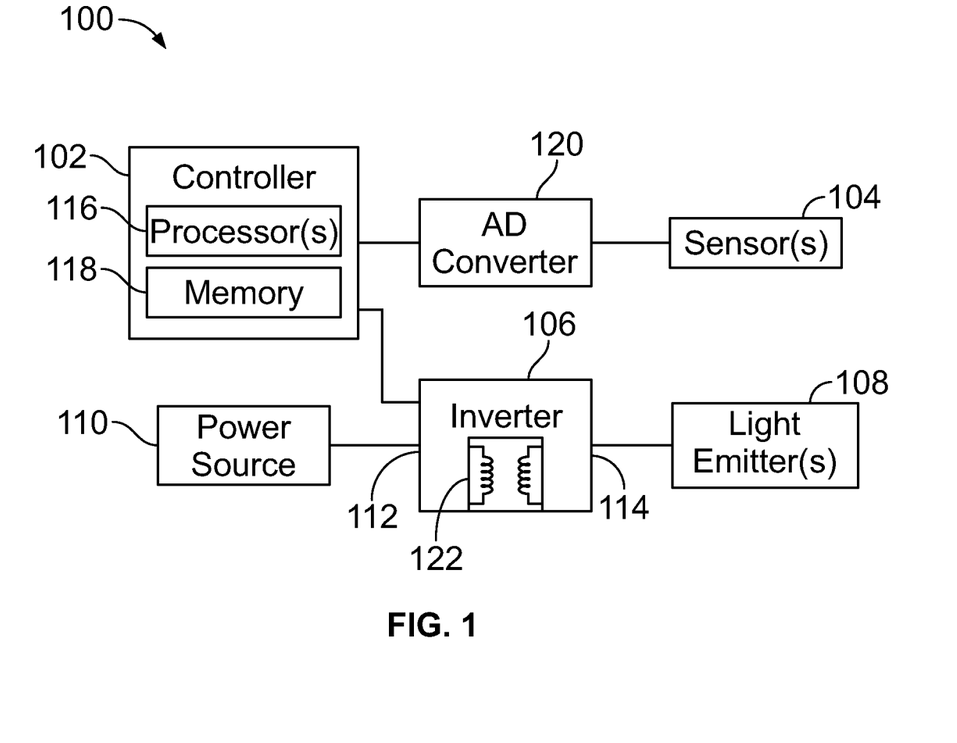
FIG. 1 is a block diagram of an display diagnostic system according to an embodiment.

FIG. 1 is a block diagram of a display diagnostic system 100 according to an embodiment. The display diagnostic system 100 includes a controller 102 that performs some or all of the operations described herein to perform diagnostics on a display device. The display diagnostic system 100 includes one or more sensors 104 for monitoring activity or operation of at least one light emitter of the display device. The display diagnostic system 100 is implemented on a display device, such as the display device 200 shown in FIG. 2. The display diagnostic system 100 may include and/or interact with various components of the display device. For example, FIG. 1 shows an inverter 106, one or more light emitters 108, and a power source 110, which are components of the display device. The power source 110 provides electrical power to an input side 112 of the inverter 106. The inverter 106 modifies one or more characteristics of the electrical power, such as the voltage, current, phase, and the like. The inverter 106 transmits the electrical power, as modified, from an output side 114 of the inverter 106 to the one or more light emitters 108. The light emitters 108 use the received electrical power from the inverter 106 to emit light that illuminates the display screen of the display device. For example, the light emitter(s) 108 may convert the electrical power that is received into light and thermal energy (e.g., heat), and the light illuminates the display screen. The light emitter(s) 108 may be LEDs or the like. The power source 110 may be one or more batteries, an external power source connected to the display device via a power cable and plug connector, or the like.

The controller 102 is operably (e.g., communicatively) connected to the other components of the display diagnostic system 100 via wired and/or wireless communication links to permit the transmission of information in the form of signals. For example, the controller 102 may receive sensor signals generated by the one or more sensors 104. The controller 102 may analyze the sensor signals to determine whether the light emitter or emitters 108 monitored by the sensor(s) 104 are active or not. The controller 102 may generate control signals that are transmitted to other components to control operation of the components. For example, the controller 102 may generate control signals to control operation of the inverter 106, to communicate a notification message to an operator or another device, or the like, as described herein. The display diagnostic system 100 may have additional components that are not shown in FIG. 1.

The controller 102 represents hardware circuitry that includes and/or is connected with one or more processors 116 (e.g., one or more microprocessors, integrated circuits, microcontrollers, field programmable gate arrays, etc.). The controller 102 may be a control unit, control system, or the like. The controller 102 includes and/or is connected with a tangible and non-transitory computer-readable storage medium (e.g., data storage device), referred to herein as memory 118. The memory 118 may store programmed instructions (e.g., software) that are executed by the one or more processors 116 to perform the display diagnostic operations described herein. The programmed instructions may include one or more algorithms utilized by the one or more processors 116. References herein to the controller 102 may refer to the one or more processors 116 thereof.

The one or more sensors 104 monitor at least one parameter of the one or more light emitters 108. For example, each sensor 104 may be associated with a specific corresponding light emitter 108 of a light emitter array of the display device. In an example, the display diagnostic system 100 may only have one sensor 104. The single sensor 104 may monitor a single parameter of one light emitter 108. For example, the sensor 104 may be a temperature sensor that may monitor thermal output of the light emitter 108 as the parameter. The temperature sensor may be a thermocouple, a thermistor, a digital temperature sensor, a resistance temperature detector (RTD), a semiconductor-based integrated circuit, or the like. The thermal output may be temperature, change in temperature, or the like. In another example, the sensor 104 may be an optical sensor that monitors optical light output of the light emitter 108 as the parameter. The optical sensor may be a photoelectric sensor, a photodiode, a phototransistor, a photodetector, or the like. The light output may be a wavelength and/or frequency of light emitted by the light emitter, an intensity of the light, a change in the wavelength, frequency, or intensity, or the like. In yet another example, the sensor 104 may be an electrical current sensor that monitors electric current received by the light emitter 108 from the inverter 106 as the parameter. The current sensor may be a Hall effect current sensor, an inductive current sensor, a magneto resistive current sensor, or the like. Optionally, the display diagnostic system 100 may include multiple sensors 104. In an example, at least two of the sensors 104 may monitor different parameters of the same or two different light emitters 108. A first sensor 104 may monitor thermal output of a first light emitter 108, and a second sensor 104 may monitor optical light output of the first light emitter 108 or a second light emitter 108. In another example, each of the multiple sensors 104 may monitor the same parameter of different light emitters 108 of the light emitter array. The one or more sensors 104 may be located at least proximate to the corresponding light emitter 108 being monitored. For example, each sensor 104 may be mounted within a threshold distance of the light emitter 108, such as within 1 cm or 2 cm of the light emitter 108. The one or more sensors 104 may be installed within a case of the display device.

The one or more sensors 104 may generate sensor signals indicative of the parameter that is monitored. The sensor signals may be communicated to the controller 102 for analysis. Optionally, the sensor signals may be analog signals or digital signals. In an example in which the sensor(s) 104 generate analog signals, the analog signals may be voltage signals, frequency signals, or the like. The controller 102 may be calibrated to transform the analog signals to values representative of the parameter being monitored. In another example in which the sensor(s) 104 generate digital signals, the digital signals may be data packets that indicate a value representative of the parameter being monitored. One example value indicates a thermal output of the light emitter 108. Optionally, the digital signals may be simple codes, such as binary codes. The binary code may indicate whether the monitored light emitter 108 is active or inactive, or indicate whether the measured parameter of the light emitter 108 is above or below a threshold value. The controller 102 receives the sensor signals generated by the one or more sensors 104 via one or more wired or wireless pathways. Optionally, the controller 102 may directly receive the sensor signals from the sensor(s) 104. The one or more processors 116 may analyze the sensor signals according to the programmed instructions in the memory 118 to determine whether the light emitter 108 that is monitored by the sensor 104 that generated the sensor signal is actively emitting light at the time that the sensor signals are generated.

The one or more processors 116 of the controller 102 optionally may indirectly receive the sensor signals via an intervening circuit component. In an embodiment, the controller 102 includes or is communicatively connected to an analog-to-digital (AD) converter 120. For example, a sensor 104 may provide an analog sensor signal to the AD converter 120. The AD converter 120 may receive the analog sensor signal and convert the analog sensor signal to a digital sensor signal. The digital sensor signal from the AD converter 120 may be transmitted to the one or more processors 116 of the controller 102 for analysis. Optionally, the digital sensor signal may be packaged with other digital data/information in a data stream that is communicated to the controller 102 via a display port link of the display device. Another embodiment may omit the AD converter 120, such as if the sensor signals are digital from the sensor(s) 104 or the controller 102 is set up to receive analog signals.

The controller 102 may control the operations of the inverter 106, such as when to supply electrical power to the light emitters 108, how to modify the characteristics of the electrical power received by the power source 110, and/or how to distribute content to the different light emitters 108 in the light emitter array. The controller 102 may control the inverter 106 by generating control signals that are communicated to the inverter 106. For example, a control communication path may extend from the controller 102 to the input side 112 of the inverter 106. The inverter 106 be controlled to modify the electrical power received from the power source 110 by stepping up the voltage and/or current. In an example, the inverter 106 may include transformer circuitry 122 that increases the voltage and/or current of the electrical power. As a result, the incoming electrical power at the input side 112 may have a first current level or value that is less than a second current level or value of the outgoing electrical power from the output side 114. The input side 112 may be referred to as a low current side, and the output side 114 may be referred to as a high current side. The incoming electrical power at the input side 112 optionally may also have a lower voltage value or level than the outgoing electrical power at the output side 114. The outgoing electrical power is conveyed to the light emitter(s) 108 to power the light emitter(s) 108. The light emitter(s) 108 may require a relatively high voltage and current, which is achievable via the inverter 106 and transformer circuitry 122 thereof stepping up the voltage and current of the received electrical power.

If the inverter 106 fails or malfunctions on the output side 114, the effect of an unlit screen would be obvious to detect but the source of the failure may be difficult to diagnose. For example, due to the transformer circuitry 122 which includes a physical gap between the windings, the output side 114 is communicatively isolated from the controller 102 and control circuitry that can report to the controller 102. As such, the controller 102 may not be able to communicate with the output side 114 of the inverter 106, the light emitter(s) 108, and other components that are on the other side of the transformer circuitry 122 from the controller 102. The controller 102 may only be communicatively connected to the light emitter(s) 108 via the inverter 106, such that the controller 102 can only control the light emitter(s) 108 by controlling the inverter 106. If a fault occurs and one or more of the light emitter(s) 108 does not receive electrical power from the inverter 106, the controller 102 cannot directly communicate with the light emitter(s) 108 and/or the output side 114 of the inverter 106 to determine a source of the fault, such as which component or components are malfunctioning or defective.

In an embodiment, the controller 102 (e.g., the one or more processors 116 thereof) analyzes the information received in the sensor signals generated by the sensor(s) 104 to determine whether or not a corresponding light emitter 108 is active or inactive. This determination is referred to as a monitored activity status of the light emitter 108. The controller 102 then compares that monitored activity status with an expected activity status of the particular light emitter 108 during the relevant time period. If the light emitter 108 is determined to be inactive during a time period that the light emitter 108 is expected to be active, then the controller 102 determines a fault state. In an example, the light emitter(s) 108 may have a longer expected operational lifespan than the inverter 106. It is more likely that the discrepancy is due to the inverter 106 being defective than a defective light emitter 108. For at least this reason, the controller 102 may determine that the inverter 106 is at fault (e.g., has a fault state) in response to the discrepancy between the expected and monitored activity of the light emitter 108.

The display diagnostic system 100 optionally may include a communication device that is operably connected to the controller 102. The communication device represents hardware circuitry that can communicate electrical signals via wired and/or wireless communication pathways. The communication device may include transceiving circuitry (e.g., a transceiver or a receiver and discrete transmitter), one or more antennas, and the like for wireless communication. The controller 102 may control the communication device to send notification messages to other electronic devices, such as a control center, an IT service center, a personal computing device of an operator that uses the display device, or the like. The notification message may provide that the display device is in a fault state and that the predicted source of the fault state is inverter failure.

The display diagnostic system 100 optionally may include an input device. The input device may be designed to receive user-based inputs from a user that interacts with the input device to generate user selections. The user selections are control signals that are communicated from the input device to the controller 102. The input device may include or represent a touch sensitive screen or touch pad, a mouse, a keyboard, a joystick, a switch, physical buttons, a microphone that receives audio inputs, and/or the like. A user may actuate the input device via touch, spoken word, or the like, to generate a user selection. In an embodiment, a user may actuate the input device to initiate a test pattern of the display diagnostic system 100.

The test pattern causes the controller 102 to control the inverter 106 to power the one or more light emitters 108 that are being monitored by the one or more sensors 104. For example, the test pattern instructs the controller 102 to cause at least a first light emitter 108 to emit light for a first period of time. The controller 102 expects the first light emitter 108 to be active during this first time period. The controller 102 then compares the monitored activity status of the first light emitter 108 during the first time period to determine if the first light emitter 108 is actually emitting light during the first time period. In one embodiment, only the first light emitter 108 is monitored by the one or more sensors 104, and the test pattern only instructs the controller 102 to power the first light emitter 108. Other light emitters 108 of the array may be inactive (e.g., unlit) during the first time period, according to the test pattern, to conserve energy. In another embodiment, the test pattern may instruct the controller 102 to power multiple light emitters 108 of the array during the same time period. The system 100 may include multiple sensors 104 for monitoring the parameters of different corresponding light emitters 108. If the monitored activity status of at least two of the light emitters 108 differs during the test pattern time period, such that one light emitter 108 is active and one is inactive, then the controller 102 may determine that the inverter 106 is not at fault. Inverter failure would block power to all of the light emitters 108 in the array, so none of the light emitters 108 would be active. The presence of at least one active light emitter 108 indicates that the source of the fault is not the inverter 106. The source may be a defective light emitter 108, defective wiring or circuitry between the inverter 106 and the array, or the like. On the other hand, if the controller 102 determines from the sensor signals that all of the monitored light emitters 108 are inactive during the test pattern time period, then that is further evidence that the source of the fault is the inverter 106.

The controller 102 may implement the test pattern on demand when receiving a user selection. The user selection to implement the test pattern may be received by the input device or via another electronic device that is communicatively connected to the display device. For example, a user may transmit a test command message to the controller 102 via a computer or personal electronic computing device (e.g., smartphone). In an embodiment, the controller 102 may perform the test pattern periodically as part of a wellness diagnostic check on the display device. For example, a setting may specify performing the test pattern once every day, once every week, once every month, or the like. At each designated time according to the setting, the controller 102 may automatically perform the test pattern unless the display device is actively being used by the operator. If the display device is being used to display content, the controller 102 may delay the test pattern until the next available time period that the display device is not displaying content.

Figure 2:
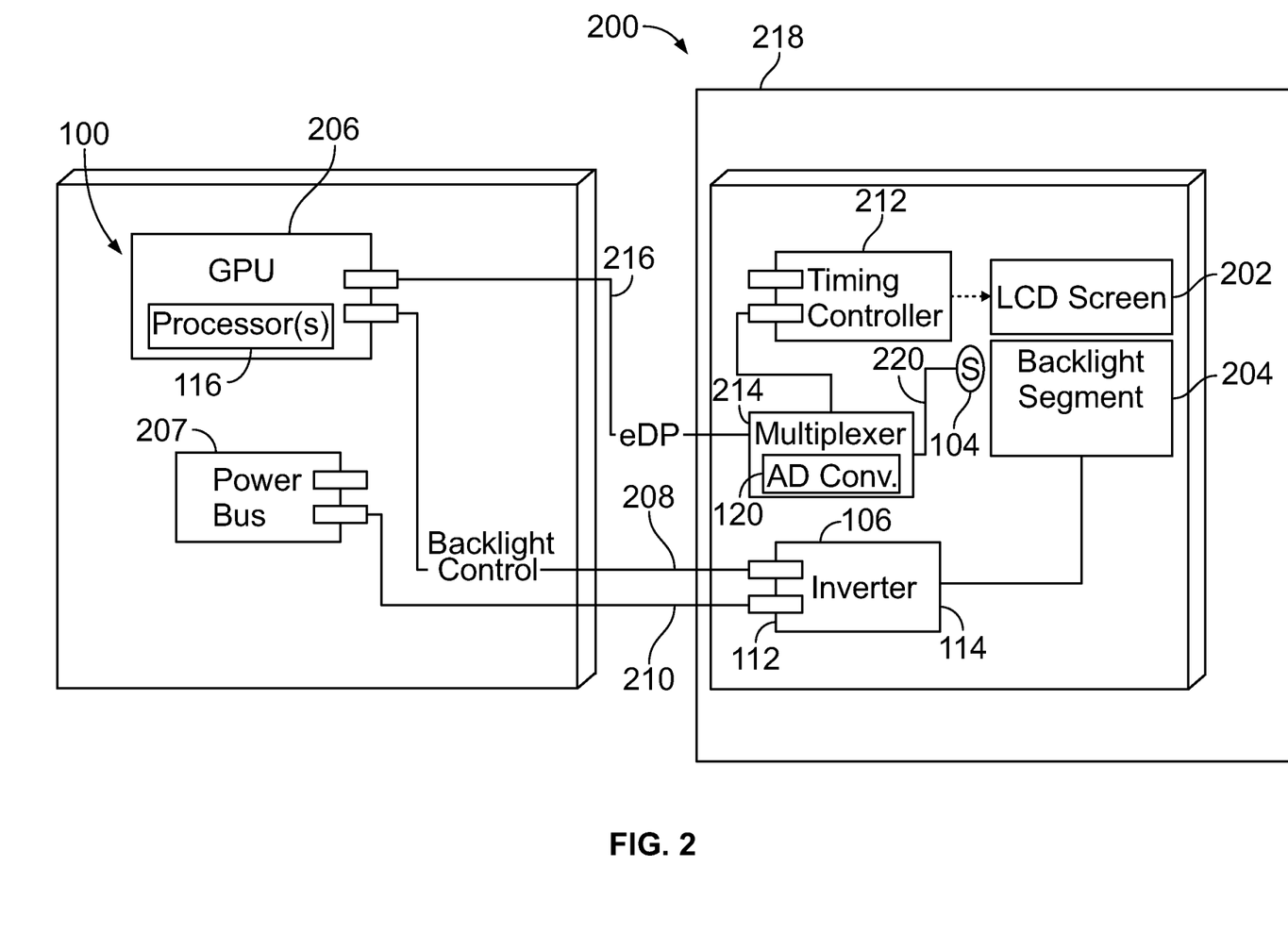
FIG. 2 is a block diagram of a liquid crystal display (LCD) device in which the display diagnostic system is implemented according to an embodiment.

FIG. 2 is a block diagram of a display device 200 in which the display diagnostic system 100 is implemented according to an embodiment. The display device 200 may be a computer monitor, a television, or the like. In an embodiment, the display device 200 is a liquid crystal display (LCD) device which includes an LCD screen 202 and a backlight 204 (e.g., backlight segment in FIG. 2). The backlight 204 includes the array of one or more light emitters 108 (shown in FIG. 1). The backlight 204 illuminates the LCD screen 202 to provide graphical content to the operator/observer. The display device 200 includes, or is connected to, a graphics processing unit (GPU) 206. The GPU 206 may represent the controller 102 or may include at least one of the one or more processors 116 of the controller 102 shown in FIG. 1. For example, one or more processors 116 of the GPU 206 may perform at least some of the operations for diagnosing the display device 200 described herein. The GPU 206 is communicatively connected to the inverter 106 of the display device 200 via a backlight control link 208. The GPU 206 may control the inverter 106 by transmitting control signals along the backlight control link 208. The display device 200 includes, or is connected to, a power bus 207 that may represent the power source 110 in FIG. 1. In an example, the power bus 207 may convey electrical power at 3.3 volts (V) and 1.5 amps (A) to the input side 112 of the inverter 106 via a power pathway 210. The electrical power from the power bus 207 may have different characteristics than the voltage and current in this example. The inverter 106 may step up the voltage and/or current before conveying the modified electrical power from the outside side 114 to the backlight 204.

In an embodiment, the display device 200 includes a timing controller 212 and a multiplexer 214. The timing controller 212 may control timing aspects of the LCD screen 202 and/or backlight 204. For example, the timing controller 212 may control the timing of graphical content being displayed on the LCD screen 202. The timing controller 212 may be communicatively connected to the GPU 206 via the multiplexer 214. The multiplexer 214 may communicate with the GPU 206 via a display port link 216. The display port link 216 may be an embedded display port. The display port link 216 may be a high speed digital signaling pathway that can convey video frames, ethernet, audio data, sensor signals, and control signals multiplexed together into a single digital bit stream by the multiplexer 214.

In the illustrated embodiment, the multiplexer 214 is communicatively connected to the one or more sensors 104. The sensor(s) 104 may be located proximate one or more of the light emitters 108 (shown in FIG. 1) of the backlight 204. For example, the sensor(s) 104 may be mounted within a case 218 of the display device 200. The sensor(s) 104 may be within the interior of the case 218, out of view of a user observing the LCD screen 202. The following description refers to a single sensor 104, but it is understood that the description may apply to each of multiple sensors 104 installed in the display device 200 to monitor one or more light emitters 108 of the backlight 204. The sensor signals generated by the sensor 104 may be conveyed via a conductive sensor signal pathway 220 to the multiplexer 214. The multiplexer 214 may package the sensor signals with other information to form a multiplexed stream that is communicated to the GPU 206 via the display port link 216.

The multiplexer 214 optionally may include the AD converter 120 shown in FIG. 1. For example, the AD converter 120 may be a portion of the multiplexer 214. Alternatively, the multiplexer 214 may be discrete from the AD converter 120 but communicatively connected to the AD converter 120. In an embodiment, the AD converter 120 may receive an analog sensor signal from the sensor 104 and may convert the analog sensor signal to a digital sensor signal. The multiplexer 214 may package the digital sensor signal in the multiplexed stream, such that the digital sensor signal is conveyed to the GPU 206 (e.g., the one or more processors 116) for analysis via the display port link 216. In an example, the multiplexer 214 may transmit the multiplexed stream including the digital sensor signal within an auxiliary channel of the display port link 216. The auxiliary channel may be a general purpose data communication channel. Other channels of the display port link 216 may be reserved for video frames, audio, ethernet, and/or the like. For example, the multiplexer 214 may tag the digital sensor signals with an auxiliary channel tag.

In an embodiment, the sensor 104 is a temperature sensor that monitors the thermal output of a corresponding one of the light emitter(s) 108. The sensor signals may indicate a temperature that is measured by the sensor 104 or whether the temperature measured by the sensor 104 exceeds a threshold. For example, the sensor signals may be binary. The sensor signal may be a first value (e.g., "1") if the sensor 104 detects that the temperature of the light emitter 108 is above 35 degrees C., or another value that represents the designated threshold. If the temperature is below the threshold, the sensor signal may be a second value (e.g., "0"). The GPU 206 receives and unpacks the multiplexed stream to isolate and collect the sensor signals for analysis. For example, the GPU 206 may include a demultiplexer. The one or more processors 116 determine the monitored activity status of the light emitter 108 based on the sensor signals. If the temperature is above the designated threshold and/or the binary code is "1", as in the previous example, then the processor(s) 116 determine that the light emitter 108 is active. The threshold may be selected to be high enough to avoid false positives due to thermal events in the surrounding environment and low enough to avoid detection delays and false negatives.

Figure 3:
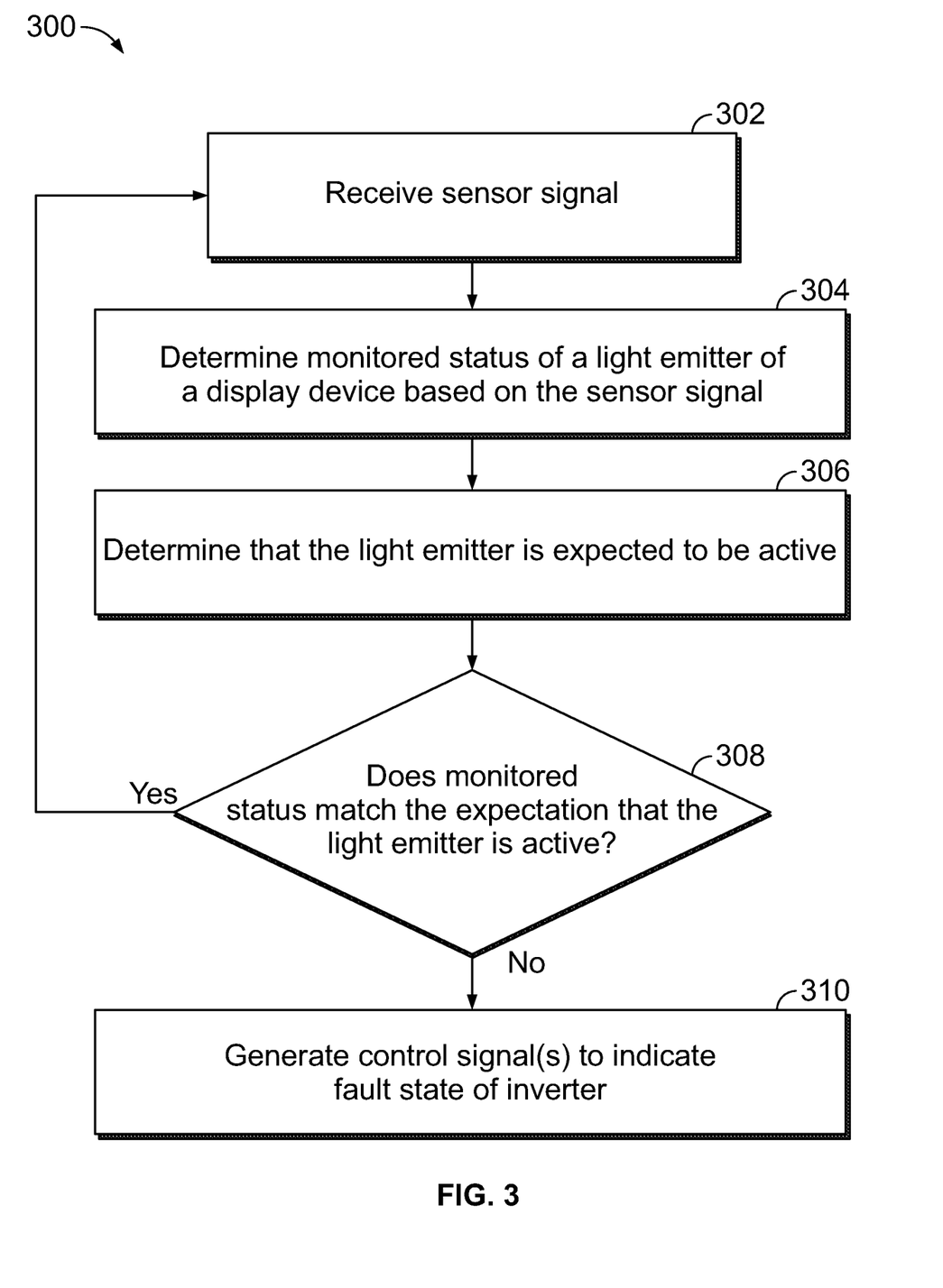
FIG. 3 is a flow chart of a method of diagnosing a display device according to an embodiment.

FIG. 3 is a flow chart 300 of a method of diagnosing a display device according to an embodiment. The method may be performed by the display diagnostic system 100 shown in FIG. 1, and optionally as implemented in the LCD device 200 shown in FIG. 2. For example, the one or more processors 116 may automatically perform at least some of the steps of the method based on programmed instructions. The programmed instructions may be stored in the memory 118. The method optionally may include at least one additional step than shown, at least one fewer step than shown, and/or at least one different step than shown in FIG. 3.

At step 302, a sensor signal is received by one or more processors 116. The sensor signal is generated by a sensor 104 that is positioned and designed to monitor a parameter of a light emitter 108 of a display device 200. The light emitter 108 receives electrical power to emit light to illuminate a display screen 202 of the display device 200. The light emitter 108 is powered by an inverter 106 of the display device 200. The sensor signal is indicative of the parameter of the light emitter 108 monitored by the sensor 104 at a first time (e.g., a moment in time or a time period). In an example, the sensor 104 is a temperature sensor, and the sensor signal provides a thermal output value of the light emitter 108 as the parameter. In another example, the sensor 104 is an optical sensor, and the sensor signal provides a light output value of the light emitter 108 as the parameter. In a third example, the sensor 104 is an electric current sensor, and the sensor signal provides a value of the electric current received by the light emitter 108 from the inverter 106 as the parameter. In an example, the sensor signal may be received along a display port link 216 of an LCD device 200. The sensor signal may be transmitted within an auxiliary channel of the display port link 216, which is also used to transmit audio and/or video. The sensor 104 may be mounted within a case 218 of the display device 200. The sensor 104 may be in close proximity to the light emitter 108 without interfering with the operation of the light emitter 108 or blocking light emitted by the light emitter 108 from reaching the LCD screen 202.

At step 304, a monitored status of the light emitter 108 at the first time is determined by the one or more processors 116 based on the sensor signal. The monitored status describes whether the light emitter 108 is active or inactive at the first time. Stated differently, the monitored status indicates whether or not the light emitter 108 emits light to illuminate the screen 202 at the first time. The monitored status may be determined by the one or more processors comparing the sensor signal to a designated threshold value. For example, if the temperature of the light emitter 108, as measured by the temperature sensor 104, is above a designated temperature, then the processor(s) 116 determine that the light emitter 108 is active. The processor(s) 116 may determine that the light emitter 108 is inactive if the temperature is at or below the threshold temperature. Designated thresholds may be used for other types of parameters as well, such as the light output and electric current. For example, if the optical sensor 104 measures a luminosity that is greater than the designated threshold, then the processor(s) 116 may determine that the light emitter 108 is active. Otherwise, the processor(s) 116 may determine that the light emitter 108 is inactive. The determination of whether or not the light emitter 108 is active may involve converting an analog sensor signal generated by the sensor 104. For example, an AD converter 120 may convert the analog sensor signal to a digital sensor signal. The digital sensor signal may be transmitted along a display port link 216 to the one or more processors 116.

At step 306, the one or more processors 116 determine that the light emitter 108 is expected to be active at the first time. For example, the processor(s) 116 determine that the expected status of the light emitter 108 is to be emitting light. The processor(s) 116 may make this determination by running the test pattern at the first time, by monitoring content that is displayed on the screen 202, and/or the like. For example, the processor(s) 116 may implement the test pattern on demand or on schedule. The test pattern may instruct the inverter 106 to power the light emitter 108 to emit light at the first time. For example, the test pattern may instruct the inverter to power the light emitter 108 at a maximum power level for a period of time that includes the first time. By implementing the test pattern, the processor(s) 116 expect the light emitter 108 to be active at the first time. In another example, the processor(s) 116 may be programmed to associate the light emitter 108 with a first area or zone of the screen 202 which the light emitter 108 illuminates. During operation of the display device 200, the processor(s) 116 may track the content that is transmitted from the GPU 206 to the inverter 106 and/or the backlight 204 over time. For example, the content that is displayed may be a movie, a television show, a video, an animation, an image, a screensaver, or the like, that is preset. The processor(s) 116 may determine, based on tracking the content, that the first area of the screen 202 is expected to be illuminated at the first time. For example, the processor(s) 116 may know that the image is displayed along at least the first area of the screen 202 that is illuminated by the light emitter 108.

At step 308, the monitored status of the light emitter 108 at the first time is compared to the expectation that the light emitter 108 is active at the first time. If the monitored status is that the light emitter 108 is active, then the monitored status matches the expected status, indicating that the display device is functional (e.g., no fault state). The method may return to step 302 to await another sensor signal and/or to await a future instruction to run this diagnostic sequence. On the other hand, if the processor(s) 116 determine that the light emitter 108 is inactive at the first time, then there is a discrepancy between the expected and monitors statuses. In that case, the method proceeds to step 310. At step 310, the processor(s) 116 signal a fault state by generating a control signal. The fault state indicates that the inverter 106 is a candidate source of the fault. For example, the fault state may indicate that the output (e.g., high current) side 114 of the inverter 106 may have failed. The processor(s) 116 may generate the control signal to perform a responsive action to alleviate the blank, unlit display screen 202. The processor(s) 116 may generate multiple control signals to perform multiple responsive actions.

One example responsive action is to electrically disconnect the display device 200, or a portion thereof, from the GPU 206. For example, the display device 200 may be a first display device 200 of multiple display devices connected to the GPU 206 and the power bus 207. The user may prefer to utilize multiple monitors to display content from the computer. In response to determining the fault state of the first display device 200, the processor(s) 116 may generate a control signal to disconnect the first display device 200. For example, the computer may automatically rearrange the display devices to omit the first display device 200. Content that was previously shown on the first display device 200 may thereafter be shown on a second display device that remains connected to the GPU 206. Furthermore, changing the display settings may prevent the operator from dragging or otherwise displaying any windows or other graphical content on the first display device 200, until the fault state has been remediated.

Another example responsive action is to notify the operator of the display device 200 that the inverter 106 is presumably defective. For example, the processor(s) 116 may generate a notification message that provides text or audio indicating that the display device 200 has the fault state. The notification message may be displayed to the operator on a second display device, such as a second monitor connected to the same computer as the display device 200. Instead, or in addition, the notification message may be communicated via the communication device to a personal electronic device of the operator, such as a smartphone or wearable computing device.

A third responsive action of the processor(s) 116 may be to log a record of the fault state of the inverter 106 in a database for record-keeping and data analysis purposes. The record may include a date stamp and a description of the fault state. A fourth responsive action may be to initiate an additional diagnostic test on the inverter 106 or schedule repair of the display device 200. The additional diagnostic test may be more complex and longer in duration than the diagnostic method described herein, but may be used to confirm whether the inverter 106 has failed. The processor(s) 116 may perform more than one of the responsive actions described herein.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. For example, "a sensor" of a system could be the only sensor of the system or one sensor of multiple sensors in the system. In the latter case, description of the sensor optionally may apply to other sensors in the system as well unless otherwise specified. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A display diagnostic system comprising:
   a memory configured to store program instructions;
   a sensor configured to monitor a parameter of a light emitter of a display device, the light emitter configured to emit light to illuminate a display screen of the display device, the light emitter powered by an inverter of the display device; and
   one or more processors communicatively connected to the memory and the sensor, wherein the program instructions are executable by the one or more processors to:
   receive a sensor signal generated by the sensor, the sensor signal indicative of the parameter of the light emitter monitored by the sensor at a first time;
   determine that the light emitter is inactive at the first time based on the sensor signal; and
   responsive to determining that the light emitter is expected to be active at the first time, generate a control signal indicating a fault state of the inverter.

2. The display diagnostic system of claim 1, wherein the sensor is a temperature sensor configured to monitor thermal output of the light emitter as the parameter.

3. The display diagnostic system of claim 1, wherein the sensor is an optical sensor configured to monitor a light output of the light emitter as the parameter.

4. The display diagnostic system of claim 1, wherein the sensor is a current sensor configured to monitor electric current received by the light emitter from the inverter as the parameter.

5. The display diagnostic system of claim 1, wherein the inverter includes transformer circuitry configured to receive electric current from a power source at a first current level and to output the electric current at a second current level to the light emitter, wherein the second current level is greater than the first current level.

6. The display diagnostic system of claim 1, wherein the display device includes a backlight, and the light emitter forms a portion of the backlight.

7. The display diagnostic system of claim 1, wherein the one or more processors are configured to implement a test pattern that instructs the light emitter to be active at the first time, the one or more processors configured to determine that the light emitter is expected to be active at the first time based on the test pattern that is implemented.

8. The display diagnostic system of claim 1, wherein the sensor signal is an analog sensor signal, and the display diagnostic system further comprises an analog-to-digital converter, the analog-to-digital converter configured to convert the analog sensor signal to a digital sensor signal which is transmitted along a display port link to the one or more processors.

9. The display diagnostic system of claim 8, wherein the digital sensor signal is transmitted to the one or more processors within an auxiliary channel of the display port link.

10. The display diagnostic system of claim 1, wherein the display device is a first display device of multiple display devices configured to display content directed by a graphics processing unit, wherein the one or more processors are configured to generate the control signal to electrically disconnect the first display device that includes the inverter that has the fault state.

11. The display diagnostic system of claim 1, wherein the one or more processors are configured to generate the control signal to one or more of (i) notify an operator of the display device that the inverter has the fault state, (ii) log a record of the fault state of the inverter in a database, or (iii) initiate an additional diagnostic test on the inverter.

12. The display diagnostic system of claim 1, wherein the sensor is disposed within a case of a display device.

13. A method for diagnosing a display device, the method comprising:
   receiving, via one or more processors, a sensor signal generated by a sensor configured to monitor a parameter of a light emitter of a display device, the light emitter configured to emit light to illuminate a display screen of the display device, the light emitter powered by an inverter of the display device, wherein the sensor signal is indicative of the parameter of the light emitter monitored by the sensor at a first time;
   determining that the light emitter is inactive at the first time based on the sensor signal; and
   responsive to determining that the light emitter is expected to be active at the first time, generating a control signal indicating a fault state of the inverter.

14. The method of claim 13, wherein the sensor is a temperature sensor, wherein receiving the sensor signal comprises receiving the sensor signal that provides a thermal output value of the light emitter as the parameter.

15. The method of claim 13, further comprising implementing a test pattern that instructs the inverter to power the light emitter to emit light at the first time, wherein the determining that the light emitted is expected to be active at the first time is based on implementing the test pattern.

16. The method of claim 13, wherein the sensor signal is an analog sensor signal, and the method further comprises:
converting the analog sensor signal to a digital sensor signal; and
transmitting the digital sensor signal along a display port link to the one or more processors.

17. The method of claim 13, wherein the display device is a first display device of multiple display devices configured to display content directed by a graphics processing unit, wherein generating the control signal indicating the fault state of the inverter comprises electrically disconnecting the first display device that includes the inverter that has the fault state.

18. The method of claim 13, wherein generating the control signal indicating the fault state of the inverter comprises one or more of (i) notifying an operator of the display device that the inverter has the fault state, (ii) logging a record of the fault state of the inverter in a database, or (iii) initiating an additional diagnostic test on the inverter.

19. A computer program product comprising a non-transitory computer readable storage medium, the non-transitory computer readable storage medium comprising computer executable code configured to be executed by one or more processors to:
receive a sensor signal generated by a temperature sensor disposed within a case of a display device, the temperature sensor configured to monitor thermal output of a light emitter of the display device, the light emitter configured to emit light to illuminate a display screen of the display device, the light emitter powered by an inverter of the display device, wherein the sensor signal is indicative of the thermal output of the light emitter monitored by the sensor at a first time;
determine that the light emitter is inactive at the first time based on the sensor signal; and
responsive to determining that the light emitter is expected to be active at the first time, generate a control signal indicating a fault state of the inverter.

20. The computer program product of claim 19, wherein the one or more processors are configured to implement a test pattern that instructs the light emitter to be active at the first time, the one or more processors configured to determine that the light emitter is expected to be active at the first time based on the test pattern that is implemented.

* * * * *